US011838250B2

(12) United States Patent
Tsukada

(10) Patent No.: US 11,838,250 B2
(45) Date of Patent: Dec. 5, 2023

(54) INFORMATION PROCESSING METHOD, STORAGE MEDIUM, AND CHAT SERVER

(71) Applicant: CANON KABUSHIKI KAISHA, Tokyo (JP)

(72) Inventor: Yoshihiro Tsukada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/830,113

(22) Filed: Jun. 1, 2022

(65) Prior Publication Data

US 2022/0393998 A1 Dec. 8, 2022

(30) Foreign Application Priority Data

Jun. 8, 2021 (JP) .................. 2021-096224

(51) Int. Cl.
*H04L 51/046* (2022.01)
*H04N 1/00* (2006.01)
*H04L 51/216* (2022.01)

(52) U.S. Cl.
CPC .......... *H04L 51/046* (2013.01); *H04L 51/216* (2022.05); *H04N 1/00212* (2013.01)

(58) Field of Classification Search
CPC ..... H04L 51/046; H04L 51/216; H04L 51/04; H04L 51/02; H04N 1/00212
See application file for complete search history.

(56) References Cited

U.S. PATENT DOCUMENTS

| 2019/0258431 A1* | 8/2019 | Yamamoto | G06F 3/1268 |
|---|---|---|---|
| 2020/0133592 A1* | 4/2020 | Mitsuhashi | G06F 3/1226 |
| 2021/0055897 A1* | 2/2021 | Tomihisa | H04L 51/10 |
| 2022/0214845 A1* | 7/2022 | Ohashi | H04L 51/046 |

FOREIGN PATENT DOCUMENTS

JP 2020154940 A 9/2020

* cited by examiner

*Primary Examiner* — Caroline H Jahnige
(74) *Attorney, Agent, or Firm* — Canon U.S.A., Inc. IP Division

(57) ABSTRACT

An information processing method includes causing an information processing apparatus to display a screen for inputting a print instruction for executing print processing based on data posted to a channel of a chat service, transmitting the data posted to the channel of the chat service to an image forming apparatus and causing the image forming apparatus to execute the print processing based on the data, based on the print instruction input via the displayed screen, and determining whether to cause the information processing apparatus to display the screen, based on attribute information about the posted data.

13 Claims, 13 Drawing Sheets

FIG. 10

| 902 FILE NAME | 903 CREATION DATE AND TIME | 904 CREATED BY | 905 UPDATE DATE AND TIME | 906 UPDATED BY | 907 PICTURE | 908 MIME TYPE |
|---|---|---|---|---|---|---|
| MATERIAL 1 | XX/XX/XXXX XX:XX | MFP1 | XX/XX/XXXX XX:XX | MFP1 | FALSE | APPLICATION/PDF |
| MATERIAL 2 | XX/XX/XXXX XX:XX | USER 3 | XX/XX/XXXX XX:XX | USER 3 | FALSE | APPLICATION/PDF |
| PICTURE 1 | XX/XX/XXXX XX:XX | BOT APPLICATION | XX/XX/XXXX XX:XX | USER 1 | TRUE | IMAGE/JPEG |
| MUSIC | XX/XX/XXXX XX:XX | USER 2 | XX/XX/XXXX XX:XX | USER 2 | FALSE | AUDIO/MPEG |
| MATERIAL 3 | XX/XX/XXXX XX:XX | USER 3 | XX/XX/XXXX XX:XX | USER 2 | FALSE | APPLICATION/MSWORD |

901

INFORMATION PROCESSING METHOD, STORAGE MEDIUM, AND CHAT SERVER

BACKGROUND OF THE DISCLOSURE

Field of the Disclosure

The present disclosure relates to an information processing method, a storage medium, and a chat server.

Description of the Related Art

Japanese Patent Application Laid-Open No. 2020-154940 discusses an apparatus that activates a chat bot configured to, in response to a user's post on a chat service, transmit uploaded image data to a printer and cause the printer to print the image data.

The chat bot discussed in Japanese Patent Application Laid-Open No. 2020-154940 causes the printer to print the image data based on a specific message (a print instruction) posted by the user on the chat. Meanwhile, a configuration in which a message for asking whether to cause the printer to print the image data is displayed in response to the upload of the image data on the chat is also possible. In this case, when the user inputs a print instruction in response to the message, the uploaded image data is printed by the printer.

In a case where the message for asking whether to cause the printer to print the image data is transmitted on the chat in response to the posting of the image data, the following issue may arise. For example, if the above-described message is displayed in a case where any data that the user does not wish to print or the user cannot print is uploaded, the display region of the chat screen is pressed for space due to the unnecessary message.

SUMMARY OF THE DISCLOSURE

The present disclosure is directed to preventing unnecessary information from being displayed in a case where information for inputting a print instruction for printing data is displayed based on the upload of the data to a chat room.

According to an aspect of the present disclosure, an information processing method includes causing an information processing apparatus to display a screen for inputting a print instruction for executing print processing based on data posted to a channel of a chat service, transmitting the data posted to the channel of the chat service to an image forming apparatus and causing the image forming apparatus to execute the print processing based on the data, based on the print instruction input via the displayed screen, and determining whether to cause the information processing apparatus to display the screen, based on attribute information about the posted data.

Further features of the present disclosure will become apparent from the following description of exemplary embodiments with reference to the attached drawings.

BRIEF DESCRIPTION OF THE DRAWINGS

FIG. 10 is a diagram illustrating attributes of files stored in the message application.

DESCRIPTION OF THE EMBODIMENTS

Exemplary embodiments of the present disclosure will be described below with reference to the drawings. Configurations illustrated in the following exemplary embodiments are an example, and the present disclosure is not intended to be limited to the illustrated configurations.

Figure 1:
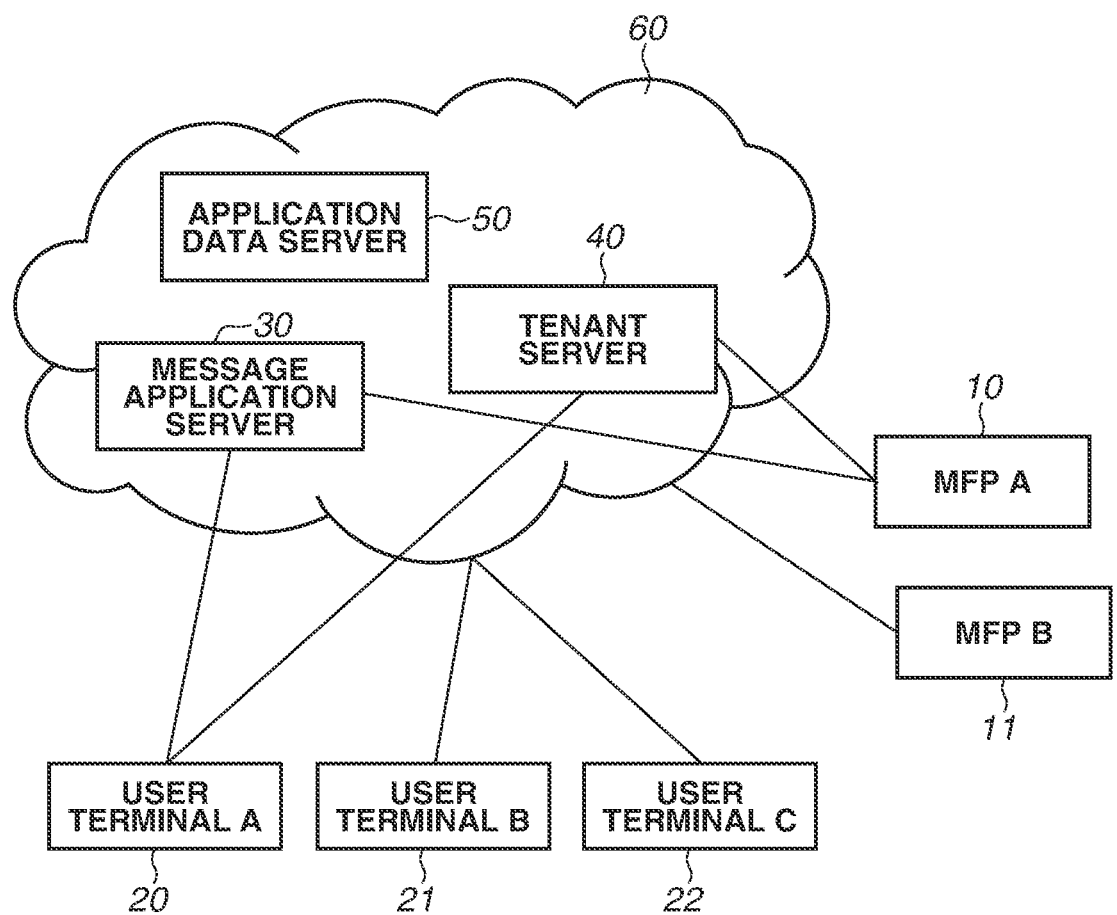
FIG. 1 is a diagram illustrating an example of a system configuration according to an exemplary embodiment of the present disclosure.

FIG. 1 illustrates an example of an entire configuration of a message application service according to an exemplary embodiment of the present disclosure. In the message application service, multifunction peripherals (MFPs) 10 and 11 (MFPs A and B), which are image processing apparatuses, and user terminals 20 to 22 (user terminals A to C) are configured as a client side. A server side is configured by a message application server 30, a tenant server 40, and an application data server 50.

Each of the MFPs 10 and 11 is an image forming apparatus having a function of printing an image received from the message application server 30 or a function of transmitting image data, which is generated by scanning a document, to the message application server 30. While in FIG. 1, the two MFPs 10 and 11 are connected to the server side as an example, the number of connected MFPs may be any number. The MFPs 10 and 11 have the same configuration, and thus the MFP 10 will be described as an example in the following description.

Each of the user terminals 20 to 22 refers to an information processing apparatus, such as a smartphone, a tablet terminal, or a personal computer, used by a user of the message application service. While in FIG. 1, the three user terminals 20 to 22 are connected to the server side as an example, the number of connected user terminals may be any number. The user operates any of the user terminals 20 to 22 to access the message application server 30 on a cloud 60, so that the user exchanges messages with another user or executes an installed application. The user terminals 20 to 22 and the message application server 30 are connected to a wired or wireless communication network, and are each capable of data transmission and reception. In the present exemplary embodiment, a public network on the Internet is assumed to be used as the communication network, but a dedicated line may be used. The user terminals 20 to 22 can have the same configuration, and thus the user terminal 20 will be described as an example in the following description.

Figure 4:
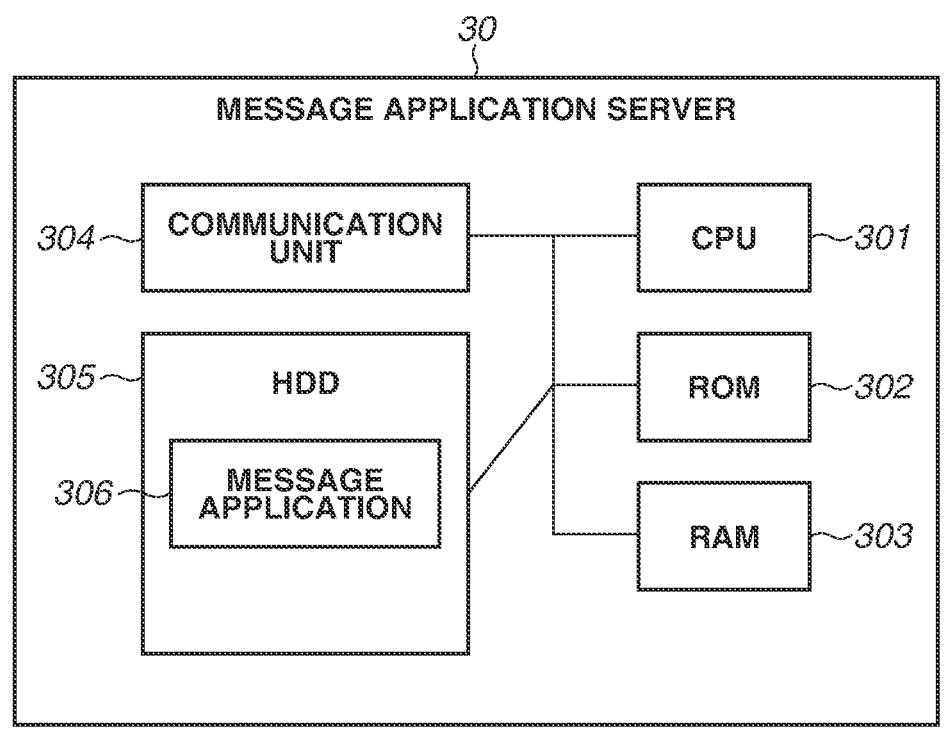
FIG. 4 is a diagram illustrating an example of a hardware configuration of a message application server.

The message application server 30 is a cloud server disposed on the cloud 60, and provides a service using a message application 306 (see FIG. 4). The message application server 30 performs entire processing regarding an exchange of messages, such as processing for transmitting and receiving messages and image data to and from the user terminals 20 to 22, and processing for displaying a screen of a chat room. The message application server 30 can group three or more members to process an exchange of messages in the group, in addition to processing an exchange of messages between two members.

The tenant server 40 is a cloud server disposed on the cloud 60, and stores and provides each piece of tenant information. Details of the tenant information stored in the tenant server 40 will be described below with reference to items illustrated in FIG. 7.

The application data server 50 is a cloud server disposed on the cloud 60, and holds data on a cooperative application 506 (a cooperative application A) that can be installed on the message application 306. In the present exemplary embodiment, the message application service has a configuration in which the application data is held in the application data server 50, but may have a configuration in which the data on the cooperative application 506 is downloaded from a network outside the cloud 60.

Figure 2:
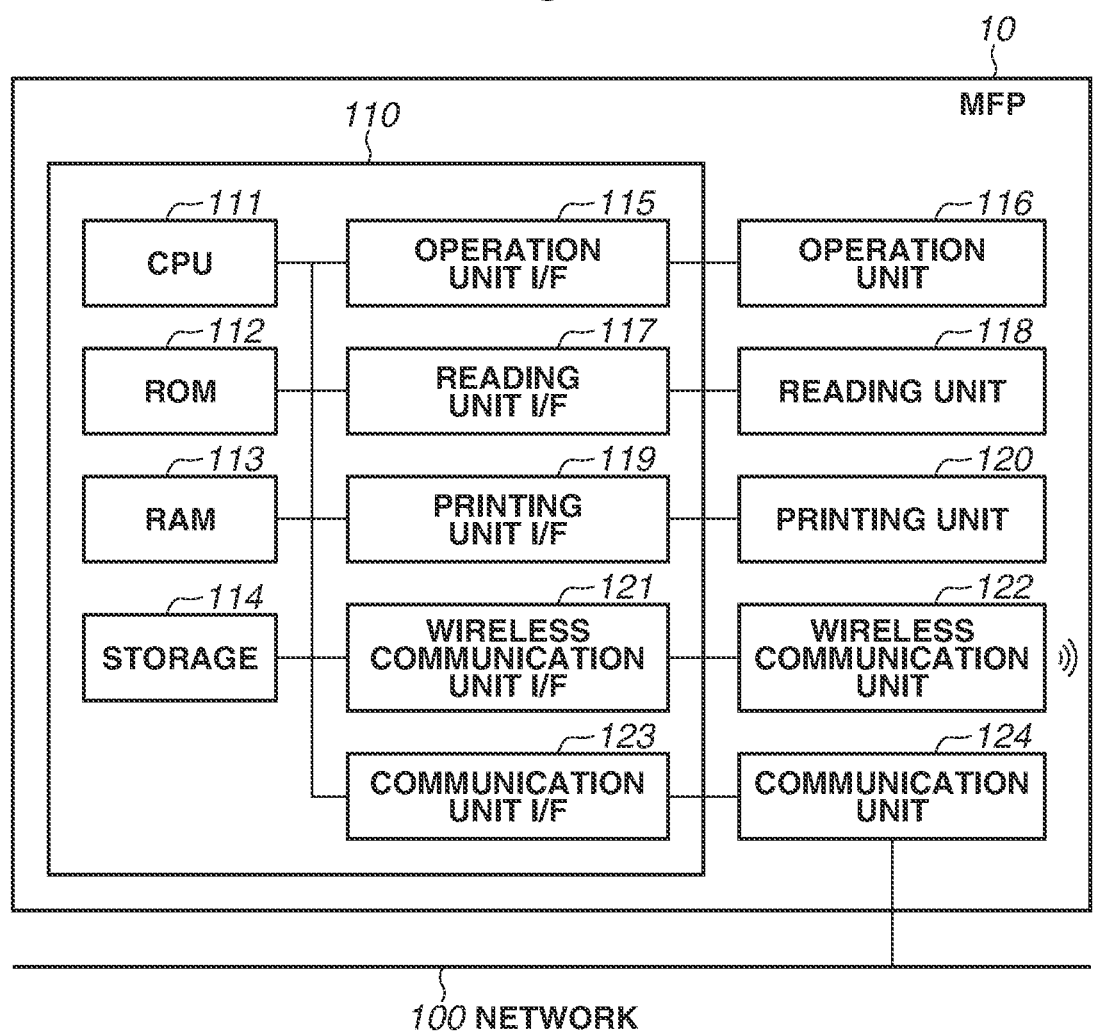
FIG. 2 is a diagram illustrating an example of a hardware configuration of a multifunction peripheral (MFP).

FIG. 2 illustrates an example of a hardware configuration of the MFP 10. The MFP 10 includes a central processing unit (CPU) 111, a read only memory (ROM) 112, a random access memory (RAM) 113, a storage 114, an operation unit interface (I/F) 115, and an operation unit 116. The MFP 10 further includes a reading unit I/F 117, a reading unit 118, a printing unit I/F 119, a printing unit 120, a wireless communication unit I/F 121, a wireless communication unit 122, a communication unit I/F 123, and a communication unit 124.

A control unit 110 including the CPU 111 controls the entire operation of the MFP 10. The CPU 111 loads a control program stored in the ROM 112 or the storage 114 into the RAM 113, and performs various kinds of control such as reading control and printing control. The ROM 112 stores the control program executable by the CPU 111. The ROM 112 also stores a boot program, font data, and the like. The RAM 113 is a main storage memory, and is used as a work area or a temporary storage area for loading various kinds of control programs stored in the ROM 112 and the storage 114. The storage 114 stores image data, print data, various kinds of programs, various kinds of addresses, and various kinds of setting information. The MFP 10 is assumed to use a flash memory as the storage 114 in the present exemplary embodiment, but may use an auxiliary storage device, such as a solid state drive (SSD) or a hard disk drive (HDD), as the storage 114. Alternatively, the MFP 10 may use an embedded Multi Media Card (eMMC) as the storage 114.

The MFP 10 according to the present exemplary embodiment is assumed to be configured so that one CPU (the CPU 111) uses one memory (the RAM 113) to perform each processing in a flowchart (described below), but is not limited thereto. For example, the MFP 10 may cause a plurality of the CPUs 111, the RAMs 113, the ROMs 112, and the storages 114 to cooperate with one another to perform each processing in the flowchart (described below). Alternatively, the MFP 10 may perform a part of the processing using a hardware circuit such as an application specific integrated circuit (ASIC) or a field programmable gate array (FPGA).

The operation unit I/F 115 connects the operation unit 116 to the control unit 110. The operation unit 116 includes a display unit, such as a touch panel, and hardware keys, and displays a screen and receives an input from the user.

The reading unit I/F 117 connects the reading unit 118, such as a scanner, to the control unit 110. The reading unit 118 reads an image on a document, so that the CPU 111 converts the read image into image data such as binary data. The image data generated based on the image read by the reading unit 118 is, for example, transmitted to an external apparatus or printed on a sheet.

The printing unit I/F 119 connects the printing unit 120, such as a printer, to the control unit 110. The CPU 111 transfers the image data (the print data) stored in the RAM 113 to the printing unit 120 via the printing unit I/F 119. The printing unit 120 prints an image based on the transferred image data on a sheet fed from a sheet feeding cassette (not illustrated).

The wireless communication unit I/F 121 is used to control the wireless communication unit 122, and wirelessly connects the control unit 110 to an external wireless apparatus. The wireless communication unit I/F 121 may use the user terminal 20 as the external wireless apparatus.

The communication unit I/F 123 is used to control the communication unit 124, and is connected to the control unit 110 and the communication unit 124. For example, the communication unit 124 transmits image data and various kinds of internal information about the MFP 10 to an external apparatus on a network 100, or receives print data and information on the network 100 from an information processing apparatus on the network 100. As a method for transmission and reception via the network 100, transmission and reception using an electronic mail (an e-mail), or file transmission using another protocol (e.g., File Transfer Protocol (FTP), Server Message Block (SMB), or Web Distributed Authoring and Versioning (WebDAV)) can be employed. Furthermore, the transmission and reception of image data and various kinds of setting data via the network 100 can be performed by access from the user terminal 20 or the message application server 30 via Hypertext Transfer Protocol (HTTP) communication.

Figure 3:
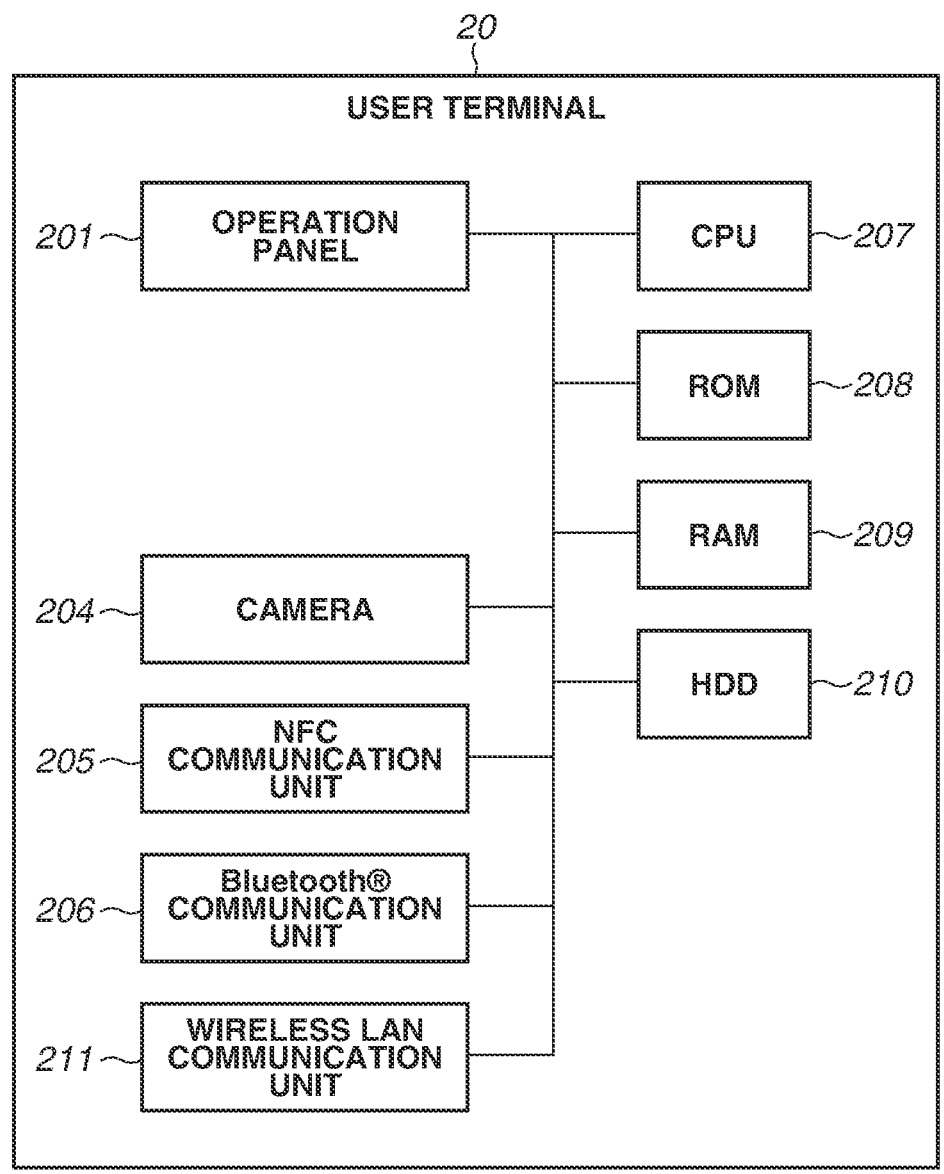
FIG. 3 is a diagram illustrating an example of a hardware configuration of a user terminal.

FIG. 3 illustrates an example of a hardware configuration of the user terminal 20. The user terminal 20 according to the present exemplary embodiment is assumed to be a client terminal apparatus such as a smartphone or a personal computer (PC).

A CPU 207 reads a control program stored in a ROM 208, and performs various kinds of processing for controlling the operation of the user terminal 20. The ROM 208 stores the control program. A RAM 209 is used as a temporary storage area such as a main memory or a work area of the CPU 207. An HDD 210 stores various kinds of data such as a picture and an electronic document.

An operation panel 201 has a touch panel function capable of detecting a touch operation of the user, and displays various kinds of screens provided by an operating system (OS) and an electronic mail transmission application. The operation panel 201 is also used to view information stored in the message application server 30. The user can input a desired operation instruction to the user terminal 20 by inputting a touch operation onto the operation panel 201. The user terminal 20 includes hardware keys (not illustrated), so that the user can use the hardware keys to input an operation instruction to the user terminal 20. The user can also perform a desired operation by connecting a keyboard, a mouse, and/or the like to the user terminal 20.

A camera 204 captures an image according to an imaging instruction from the user. A picture captured by the camera 204 is stored in a predetermined area of the HDD 210. In addition, information can be acquired from a Quick Response (QR) Code® read by the camera 204 using a program capable of analyzing the QR Code®.

The user terminal 20 can transmit and receive data to and from various kinds of peripheral devices via a Near Field Communication (NFC) communication unit 205, a Bluetooth® communication unit 206, and a wireless local area network (LAN) communication unit 211.

The Bluetooth® communication unit 206 of the user terminal 20 may support Bluetooth® Low Energy.

FIG. 4 illustrates an example of a hardware configuration of the message application server 30. A CPU 301 reads out a control program stored in a ROM 302 and the message application 306 stored in an HDD 305, and performs various kinds of processing for controlling the operation of the message application server 30. The ROM 302 stores the control program. A RAM 303 is used as a temporary storage area such as a main memory or a work area of the CPU 301. The HDD 305 stores various kinds of data such as a message, an image, channel information, and an application. The message application server 30 can transmit and receive data to and from various kinds of apparatuses, such as the user terminal 20 and the MFP 10, via a communication unit 304. The communication unit 304 may carry out wired communication using Ethernet® or may carry out wireless communication such as Wireless Fidelity (Wi-Fi). The message application 306 is installed on the HDD 305, and runs on the CPU 301.

Figure 5:
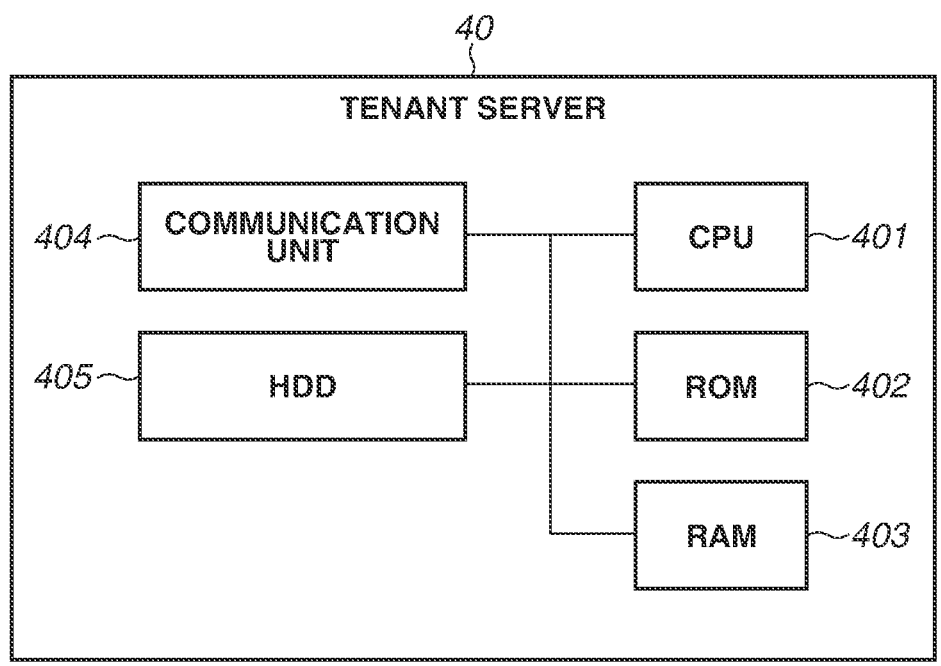
FIG. 5 is a diagram illustrating an example of a hardware configuration of a tenant server.

FIG. 5 illustrates an example of a hardware configuration of the tenant server 40. A CPU 401 reads out a control program stored in a ROM 402, and performs various kinds of processing for controlling tenant information 601. The tenant information 601 stored in an HDD 405 will be described below. The ROM 402 stores the control program. A RAM 403 is used as a temporary storage area such as a main memory or a work area of the CPU 401. The HDD 405 stores the tenant information 601 and the like. The tenant server 40 can transmit and receive data to and from an apparatus, such as the message application server 30, via a communication unit 404. The communication unit 404 may carry out wired communication using Ethernet® or may carry out wireless communication such as Wi-Fi.

Figure 6:
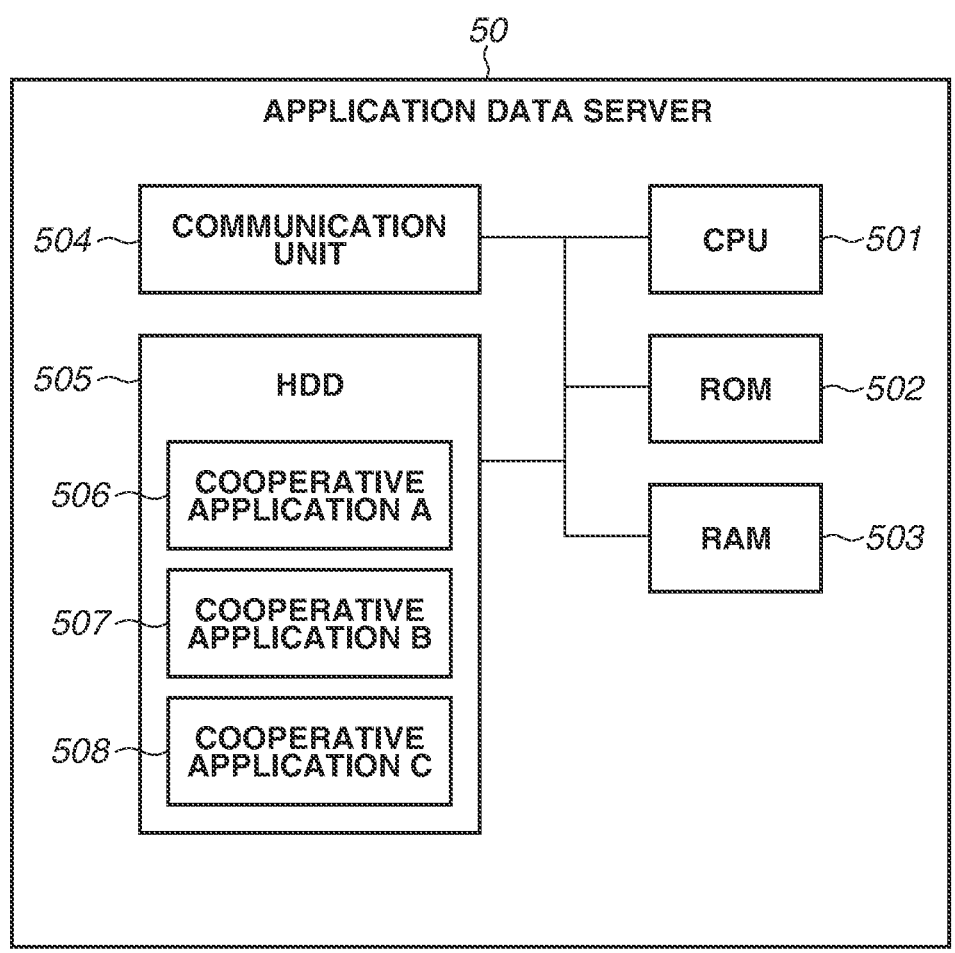
FIG. 6 is a diagram illustrating an example of a hardware configuration of an application data server.

FIG. 6 illustrates an example of a hardware configuration of the application data server 50.

A CPU 501 reads out a control program stored in a ROM 502, and performs various kinds of processing for controlling the application data server 50. The ROM 502 stores the control program. A RAM 503 is used as a temporary storage area such as a main memory or a work area of the CPU 501. An HDD 505 stores the cooperative application 506 (the cooperative application A), a cooperative application 507 (a cooperative application B), and a cooperative application 508 (a cooperative application C). A communication unit 504 can transmit and receive data to and from an apparatus such as the message application server 30. Each of the cooperative applications 506 to 508 (the cooperative applications A to C) is configured to operate in cooperation with the message application 306, and is stored in the HDD 505. The cooperative applications 506 to 508 (The cooperative applications A to C) are transmitted to the message application server 30 via the communication unit 504 and installed on the message application server 30 according to a command. At this time, the cooperative applications 506 to 508 (the cooperative applications A to C) are installed on the HDD 305 of the message application server 30.

Figure 7:
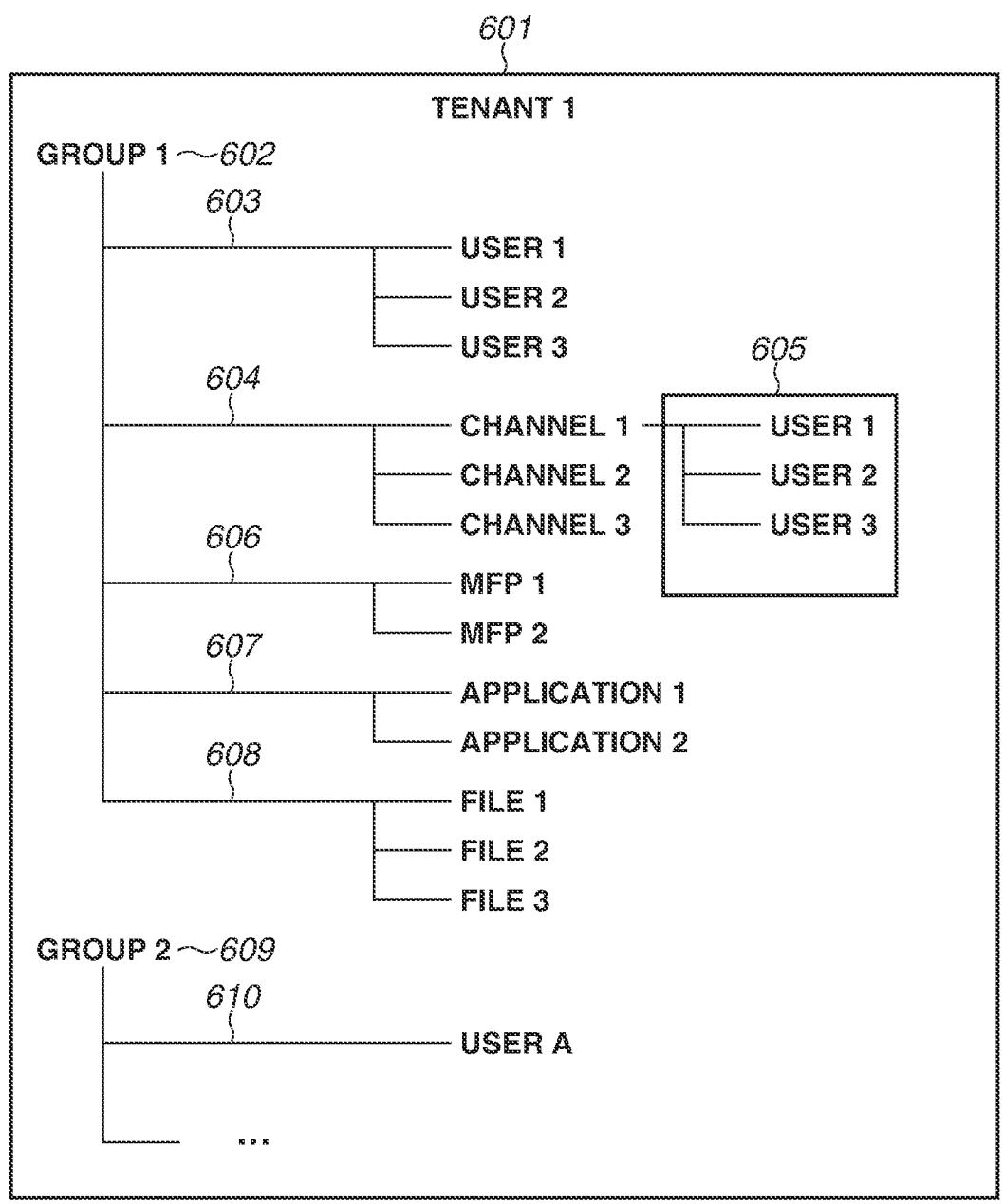
FIG. 7 is a diagram illustrating an example of tenant information stored in the tenant server.

FIG. 7 illustrates an example of the tenant information 601 stored in the HDD 405 of the tenant server 40. One or more groups are associated with the tenant information 601. In the example of FIG. 7, two groups, i.e., group 1 (group information 602) and group 2 (group information 609) are included in the tenant information 601. Depending on the configuration of the message application 306, one tenant information (the tenant information 601) may contain one group information. In this case, the tenant information 601 and the group information are equivalent to each other.

Each of the group 1 (the group information 602) and the group 2 (the group information 609) has information about the structure of the group. User information 603, channel information 604, printer information 606, cooperative application information 607, and file information 608 are associated with the group 1 (the group information 602).

The user information 603 is information for identifying each user belonging to the group 1. The channel information 604 is information for grouping the user information 603, and contains a list 605 for each channel. In the list 605, the user information 603 corresponding to the channel is grouped. On the message application 306, a talk room (a chat room) is generated for each channel indicated in the channel information 604, and the user exchanges messages and image data with another user in this talk room.

The printer information 606 is information for identifying the MFP 10. The printer information 606 may be an Internet Protocol (IP) address or a Media Access Control (MAC) address of the MFP 10, or may be an identifier (ID) for uniquely identifying the MFP 10. The ID may be an ID issued by the tenant server 40 when information about the MFP 10 is registered in the tenant server 40. An application using the group information 602 can refer to the printer information 606 to transmit a command, such as a print command, to a desired MFP. In the example of FIG. 7, the printer information 606 is associated with a group (i.e., the group 1), but may be associated with a channel or a cooperative application. For example, an MFP 1 may be associated with an application 1 and the MFP 1 and an MFP 2 may be associated with an application 2. Alternatively, the printer information 606 may be associated with the tenant information 601. More specifically, in the case of tenant 1 illustrated in FIG. 7, the MFP 10 indicated by the printer information 606, which is shared by and associated with the tenant 1, may be used.

The cooperative application information 607 is information for identifying a cooperative application associated with the group 1 (the group information 602). A cooperative application indicated by the cooperative application information 607 is installed on the message application server 30.

The file information 608 is stored in association with the group 1 (the group information 602).

For example, transmitting the file information 608 to the MFP 10 enables the MFP 10 to print the corresponding file. The file information 608 is associated with a group (i.e., the group 1), but may be associated with a channel. For example, when some user posts a file to a channel 1, which is a talk room, the posted file is stored in association with the channel 1. Furthermore, the user can, for example, view the stored file in the channel 1 or download the stored file to the user terminal 20.

When a user list is referred to in the message application 306 corresponding to the tenant information 601, the message application server 30 refers to the information stored in the HDD 405 of the tenant server 40, via the communication unit 304. The information referred to at this time is information in which the group information 602 and the user information 603 are listed. The same also applies to the channel information 604, the printer information 606, the cooperative application information 607, and the file information 608.

Figure 8:
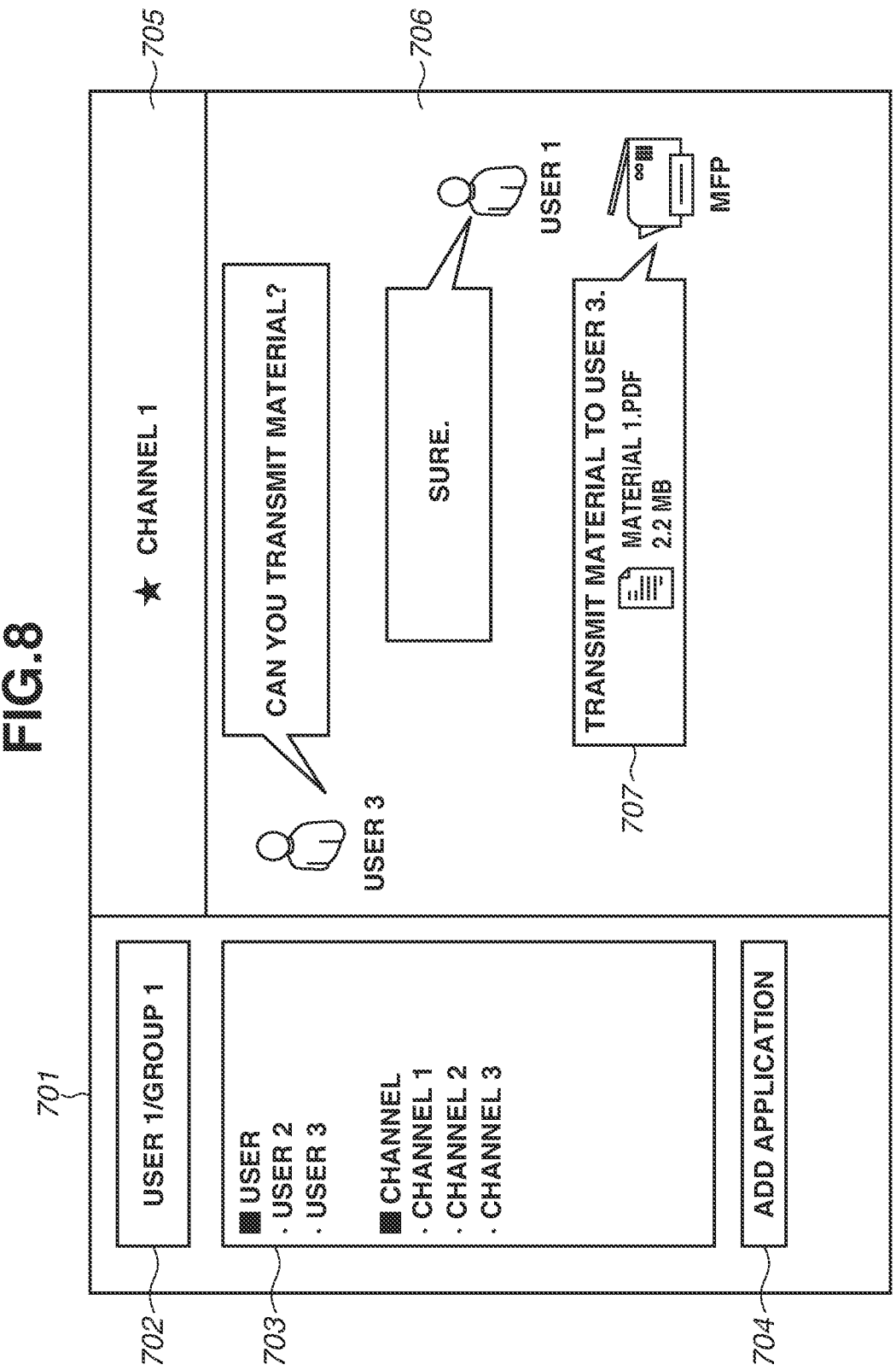
FIG. 8 is a diagram illustrating an example of a message screen of a message application.

FIG. 8 illustrates an example of a message screen displayed on the operation panel 201 of the user terminal 20. When the message application server 30 executes the message application 306 corresponding to the group 1 (the group information 602), screen data is transmitted to the user terminal 20 and a message screen 701 is displayed by the user terminal 20 based on the screen data.

The message screen 701 is displayed in a case where a user 1 accesses the message application 306 associated with the group 1 (the group information 602).

In a display region 702, the user information 603 about the user 1 and the group information 602 about the group 1 to which the user 1 belongs to are displayed.

In a display region 703, the user information 603 about users 2 and 3 (i.e., information about the other users belonging to the group 1) and the channel information 604 (i.e., information about channels 1 to 3 generated in the group 1) that are associated with the group information 602 are displayed. When the user 1 selects a desired communication partner in the display region 703, the message screen 701 for exchanging messages with the selected communication partner is displayed, so that the user 1 can exchange messages with the partner. At this time, in a case where a desired channel is selected from the channel information 604, the message screen 701 for exchanging messages with all members belonging to the selected channel is displayed, so that the user 1 can exchange messages with all the members.

A button 704 is an object for adding the cooperative application 506 (the cooperative application A). When the button 704 is pressed, installation of the cooperative application 506 (the cooperative application A) is performed. In the present exemplary embodiment, the cooperative application 506 (the cooperative application A) is to be installed, but a list of the other cooperative applications may be displayed to prompt the user 1 to select a cooperative application to be installed.

A display region 705 displays the communication partner with which the user 1 is currently exchanging messages. In other words, the communication partner selected in the display region 703 is displayed in the display region 705. On the message screen 701, the channel 1 is selected.

A history of exchanged messages is displayed in messages 706 and 707. A message may simply contain text as indicated by the message 706, or the file information 608 may be added to text as indicated by the message 707. The message 707 is displayed when a document is scanned by the MFP 10 and the resulting file is uploaded from the MFP 10.

Figure 9:
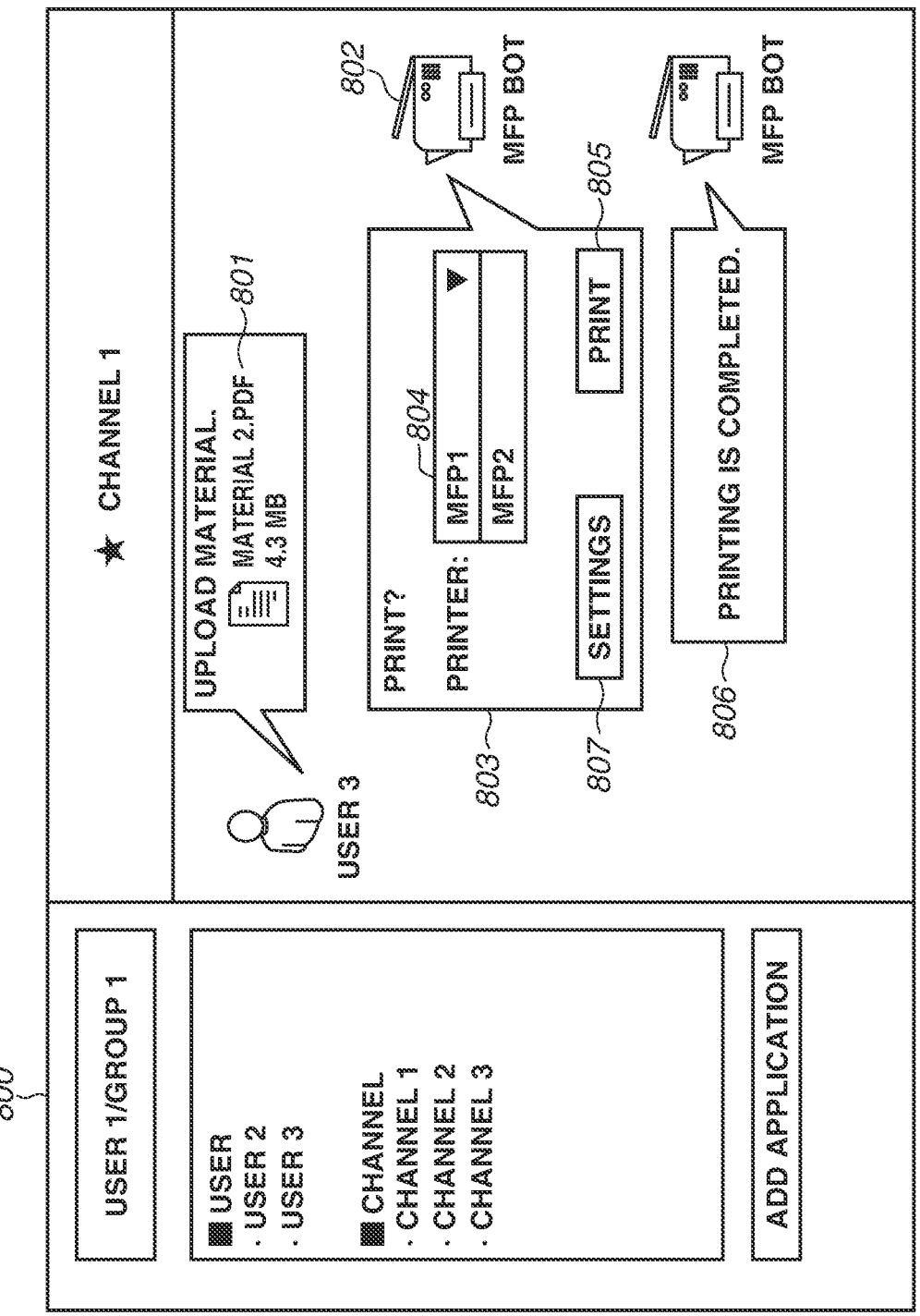
FIG. 9 is a diagram illustrating a printing proposal screen of the message application.

FIG. 9 illustrates another example of the message screen displayed on the operation panel 201 of the user terminal 20. A message screen 800 is displayed in a case where the user 1 accesses the message application 306 associated with the group information 602.

A message 801 is displayed when a material is uploaded and a text saying "Upload a material." is posted by the user 3.

An icon 802 indicates an MFP Bot application installed in association with the channel 1. The MFP Bot application is an example of the above-described cooperative application.

A message 803 is posted by the MFP Bot application that has detected the upload of a file based on the message 801.

A list 804 is a list of the MFPs 10 capable of printing the material, and is used to prompt the user 1 to select the MFP 10 to which a print instruction is to be issued.

A button 805 is a "Print" button for issuing the print instruction to the MFP 10 selected from the list 804. The selection of the button 805 enables the MFP Bot application to transmit the uploaded file in the message 801 and the print instruction to the MFP 10 selected from the list 804. The print instruction contains print setting information that is set based on the selection of a button 807 (described below). The MFP 10 that has received the file and the print instruction prints an image based on the received file (image data) on a sheet based on the received print instruction.

The button 807 is used to make print settings, and the selection of the button 807 causes a print settings screen (not illustrated) to be displayed, so that the print settings can be input by a user's operation.

A message 806 indicates that the printing performed in response to the selection of the button 805 is completed. The message 806 is posted by the MFP Bot application when the message application server 30 receives a print completion notification from the MFP 10 to which the file and the print instruction are transmitted.

The example of FIG. 9 illustrates a case where the user 1 can select the displayed "Print" button (the button 805) to issue the print instruction to the MFP 10, but the present exemplary embodiment is not limited thereto. For example, the MFP Bot application may post a message "Print?" upon detecting the upload of a file. Then, the MFP Bot application may transmit the file and the print instruction to the registered MFP 10 when the user 1 posts a message "Print." in response to the message "Print?". In this case, the user may return a message "Print using MFP 1." in response to the message "Print?", so that the user can transmit the file and the print instruction and also select the MFP 10 by which the file is to be printed.

The MFP Bot application can detect not only the upload of a file by the user, but also the upload of a file, which is generated by scanning a document by the MFP 10, by the MFP 10 or the cooperative application cooperating with the MFP 10, like the message 707 in FIG. 8.

FIG. 10 illustrates an example of attribute information 901 about the file information 608. The attribute information 901 is generated for each file when the file is uploaded to the message application server 30. The attribute information 901 is stored in the HDD 305 of the message application server 30. The attribute information 901 is generated, for example, when the user 3 uploads a file to the channel 1 as illustrated in FIG. 9.

A File Name field 902 indicates the name of the file. A Creation Date and Time field 903 indicates a date and time when the file is uploaded to the message application server 30. A Created By field 904 indicates the user who has uploaded the file. For example, if the file is uploaded by the MFP 10, the MFP 10 is specified in the Created By field 904. If the file is uploaded by the user, the user is specified in the Created By field 904. Alternatively, if the file is uploaded by the cooperative application, the Bot application is specified in the Created By field 904. An Update Date and Time field 905 indicates a date and time when the file is updated. An Updated By field 906 indicates who or what has updated the file, and the MFP 10 such as the MFP 1, the user such as the user 3, the Bot application, or the like is specified in the Updated By field 906. A Picture field 907 is a flag indicating whether the file is a picture, and is set to TRUE if information at the time of imaging by the camera 204 is stored and is otherwise set to FALSE. A Multipurpose Internet Mail Extensions (MIME) type field 908 indicates the MIME type of the file, and is set to application/pdf if the file is a Portable Document Format (PDF) document, set to image/jpeg if the file is a Joint Photographic Experts Group (JPEG) file, and set to application/msword if the file is a word document. It can be seen that, regarding material 1, which is an example of a result of reading the attribute information 901, the file is a PDF document created and updated by the MFP 1. It can also be seen that, regarding material 3, the file is a word document created by the user 3 and then updated by the user 2. In other words, the file format of the file can be identified based on the MIME type 908.

Figure 11:
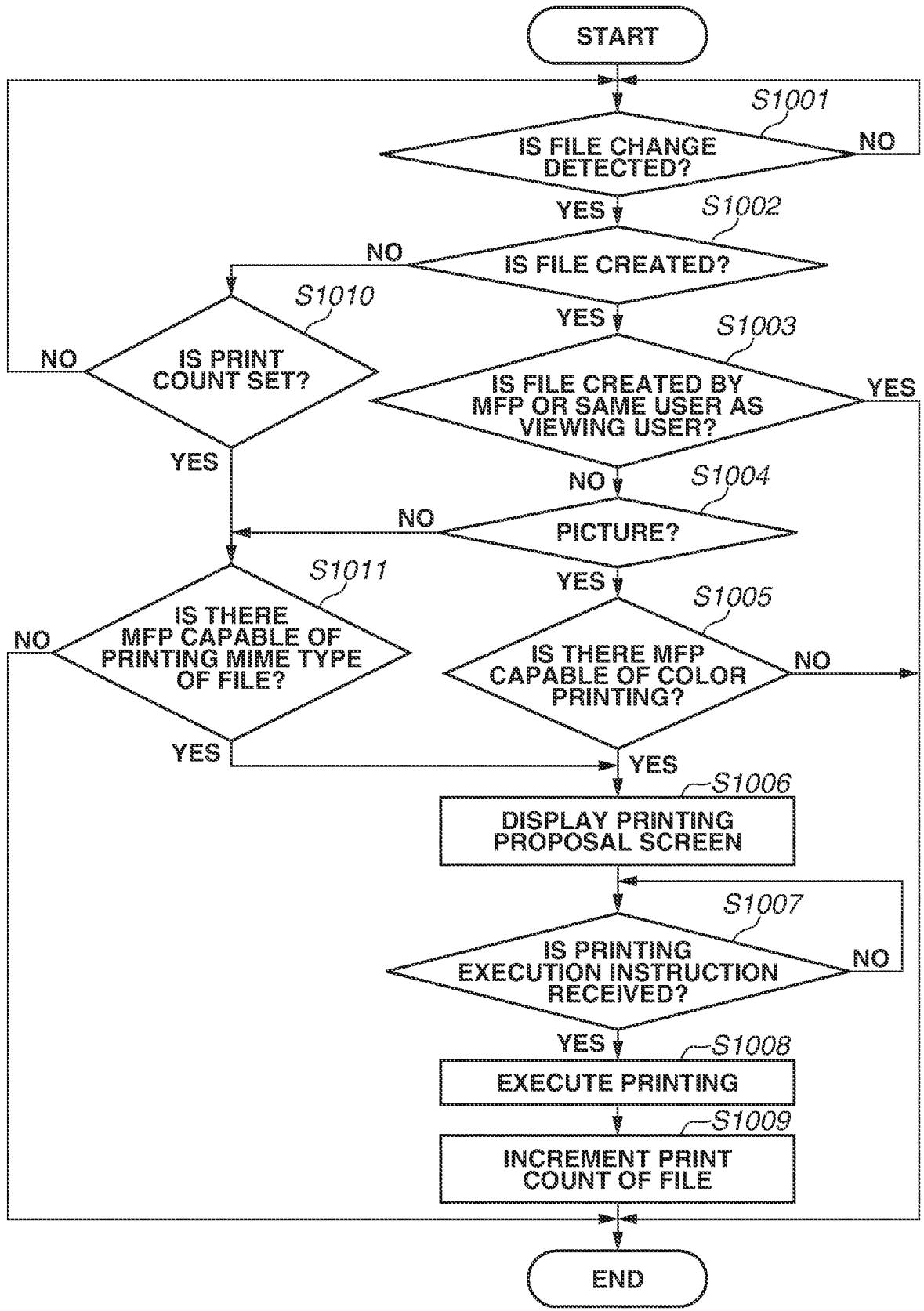
FIG. 11 is a flowchart illustrating printing proposal processing by a cooperative application.

FIG. 11 is a flowchart illustrating an example of printing proposal processing by the cooperative application 506 (the cooperative application A). FIG. 11 is also a flowchart illustrating processing by the message application server 30 illustrated in FIG. 13 (described below). The flowchart in FIG. 11 is started when the user 1 accesses the message application server 30 using the user terminal 20 and the message application server 30 receives a request for displaying a message screen.

An example where the cooperative application 506 (the cooperative application A) is associated with a channel will be described. The flowchart in FIG. 11 is performed independently for each user belonging to the channel associated with the cooperative application 506 (the cooperative application A). A case where the user 1 accesses the message application server 30 using the user terminal 20 and the message application server 30 receives a request for displaying the message screen corresponding to the user 1 will be described as an example. Thus, the target user in the following description is the user 1. If the message application server 30 receives a request for displaying a message screen from another user (e.g., the user 2 or the user 3), the flowchart in FIG. 11 is started independently.

Furthermore, the flowchart in FIG. 11 is implemented when the CPU 301 of the message application server 30 executes the cooperative application 506 (the cooperative application A) and the cooperative application 506 (the cooperative application A) causes the message application server 30 to perform each processing.

In step S1001, the cooperative application 506 (the cooperative application A) determines whether a file change is detected in the message application server 30. If a file change is not detected (NO in step S1001), the processing returns to step S1001. If a file change is detected (YES in step S1001), the processing proceeds to step S1002. More specifically, the cooperative application 506 (the cooperative application A) determines whether a file is uploaded to the channel with which the cooperative application 506 (the cooperative application A) is associated. If a file is uploaded (YES in step S1001), the processing proceeds to step S1002. If not (NO in step S1001), the processing returns to step S1001.

In step S1002, the cooperative application 506 (the cooperative application A) refers to the attribute information 901. If the target file, from which the change is detected, is created (YES in step S1002), the processing proceeds to step S1003. If the file is updated (NO in step S1002), the processing proceeds to step S1010. Whether the file is created is determined based on whether the Creation Date and Time field 903 and the Update Date and Time field 905 indicate the same date and time or whether the Update Date and Time field 905 is blank. Alternatively, the processing in step S1002 may be skipped.

In step S1003, the cooperative application 506 (the cooperative application A) determines whether the Created By field 904 for the file indicates a print target MFP, a cooperative application for cooperating with the print target MFP, or the same user as the target user who has transmitted the request for displaying a message screen. If the file is created by any of the above-described MFP, cooperative application, and user (YES in step S1003), the processing by the cooperative application 506 (the cooperative application A) is ended. If not (NO in step S1003), the processing proceeds to step S1004. The print target MFP refers to the MFP 10 to which the cooperative application 506 (the cooperative application A) can transmit a file and a print instruction, and the MFP 10 to be displayed in the list 804. The MFP 10 to be displayed in the list 804 is associated with the user accessing the message application server 30 using the user terminal 20 in order to display the message 803. In other words, the MFP 10 displayed in the list 804 may be different for each user who displays the message 803. Furthermore, each user and the MFP 10 are preregistered in the tenant server 40 in association with each other.

Basically, the MFP 10 located close to the target user is set as the print target MFP. In other words, the file uploaded from the print target MFP or the cooperative application cooperating with the print target MFP is a file (image data) generated by scanning a document by the MFP 10 close to the target user. This means that the user who has scanned the document is likely to present nearby. In a case where the target user wishes to obtain a print of such a file (image data), if the user possessing the document makes a copy of the document using the MFP 10 and hands out the copy directly, not via the chat service, the target user with whom the file is shared can save time and effort to print the file. Thus, processing such as processing in step S1003 is performed, and the message 803 for proposing printing is not to be posted in a case where the file is uploaded from the print target MFP or the cooperative application cooperating with the print target MFP. In this case, the message 803 is not to be displayed on the message screen of the user 1.

In addition, in a case where the user 1, which is the target user, uploads the file by himself or herself, the message 803 for proposing printing is not to be posted. In other words, the message 803 is not to be displayed on the message screen of the user 1. This is because, in a case where the target user uploads the file by himself or herself, the target user is likely to possess the document from which the file (the image data) is generated. Thus, in a case where the file is uploaded by the same user as the target user among a plurality of users accessing the message application server 30, the message 803 for proposing printing is not to be posted for the target user. In other words, in a case where the file is uploaded by the user 1, the message 803 for proposing printing is not to be posted for the user 1 but the message 803 for proposing printing is to be posted for the user 2 and the user 3. In other words, the message 803 for proposing printing is displayed on the message screens of the user 2 and the user 3. Alternatively, the processing in step S1003 may be skipped.

In step S1004, the cooperative application 506 (the cooperative application A) refers to the Picture field 907 in the attribute information 901. If the flag is set to TRUE (YES In step S1004), the processing proceeds to step S1005. If the flag is set to FALSE (NO in step S1004), the processing proceeds to step S1011. In other words, if the uploaded file is a picture (YES in step S1004), the processing proceeds to step S1005. If not (NO in step S1004), the processing proceeds to step S1011. Alternatively, the processing in step S1004 may be skipped and the processing may always proceed to step S1011.

In step S1005, the cooperative application 506 (the cooperative application A) determines whether the MFP 10 capable of color printing is accessible, based on the printer information 606. If the MFP 10 capable of color printing is accessible (YES in step S1005), the processing proceeds to step S1006. If the MFP 10 capable of color printing is not accessible (NO in step S1005), the processing by the cooperative application 506 (the cooperative application A) is ended. Alternatively, the processing in step S1005 may be skipped. Basically, picture data is printed in color. Thus, the message 803 for proposing printing is not to be posted if the MFP 10 capable of color printing is not registered.

In step S1006, the cooperative application 506 (the cooperative application A) posts the message 803 for proposing printing, and the message application 306 generates screen data for displaying the posted message 803. Upon receiving the screen data, the user terminal 20 displays the message screen based on the screen data.

In step S1007, the cooperative application 506 (the cooperative application A) determines whether the button 805 is pressed by the user 1. If the button 805 is pressed (YES in step S1007), the processing proceeds to step S1008. If the button 805 is not pressed (NO in step S1007), the processing in step S1007 continues and waits for a user's operation.

In step S1008, the cooperative application 506 (the cooperative application A) causes the MFP 10 selected from the list 804 to execute printing. Then, the processing proceeds to step S1009. The processing in step S1008 will be described in detail below with reference to FIG. 13.

In step S1009, upon receiving a print completion notification from the MFP 10 to which the file and the print instruction have been transmitted, the cooperative application 506 increments a print count of the file. Then, the cooperative application 506 (the cooperative application A) posts the message 806 indicating the completion of the printing to the message application 306. The message application 306 generates screen data for displaying the posted message 806.

In step S1010, the cooperative application 506 (the cooperative application A) determines whether the print count is set for the file. If the print count is set (YES in step S1010), the processing proceeds to step S1011. If no print count is set (NO in step S1010), the processing returns to step S1001. Setting the file, whose update is detected and print count is set, as the printing target enables printing to be proposed for the file likely to be printed again. In other words, even if a file not previously printed is updated, printing is not to be proposed for the file. Alternatively, the processing in step S1010 may be skipped.

In step S1011, the cooperative application 506 (the cooperative application A) determines the MIME type of the file. Then, the cooperative application 506 (the cooperative application A) determines whether the MFP 10 capable of printing the determined MIME type is present. If the MFP 10 capable of printing the determined MIME type is present (YES in step S1011), the processing proceeds to step S1006. If not (NO in step S1011), the processing is ended. In other words, the cooperative application 506 (the cooperative application A) determines whether the file format of the uploaded file is supported by the MFP 10 to which the uploaded file is to be transmitted. More specifically, the cooperative application 506 (the cooperative application A) determines whether the MFP 10 registered in association with the user 1 logged in the message application server 30 is capable of printing the uploaded file. For example, a PDF file is determined to be printable but moving image data and audio data such as Moving Picture Experts Group (MPEG) data are determined to be not printable. The cooperative application 506 (the cooperative application A) may post a message such as "No printer can print this file" in a case where the MFP 10 capable of printing the determined MIME type is not present.

In the processing in step S1011, the cooperative application 506 (the cooperative application A) determines whether the MFP 10 preregistered in the tenant server 40 in association with the target user is capable of printing the above-described MIME type.

For example, since the MFP 10 is capable of printing a file such as a PDF file but is not capable of printing a moving image file or an audio file such as an MPEG file, the message 803 for proposing printing is not to be posted.

Figure 12:
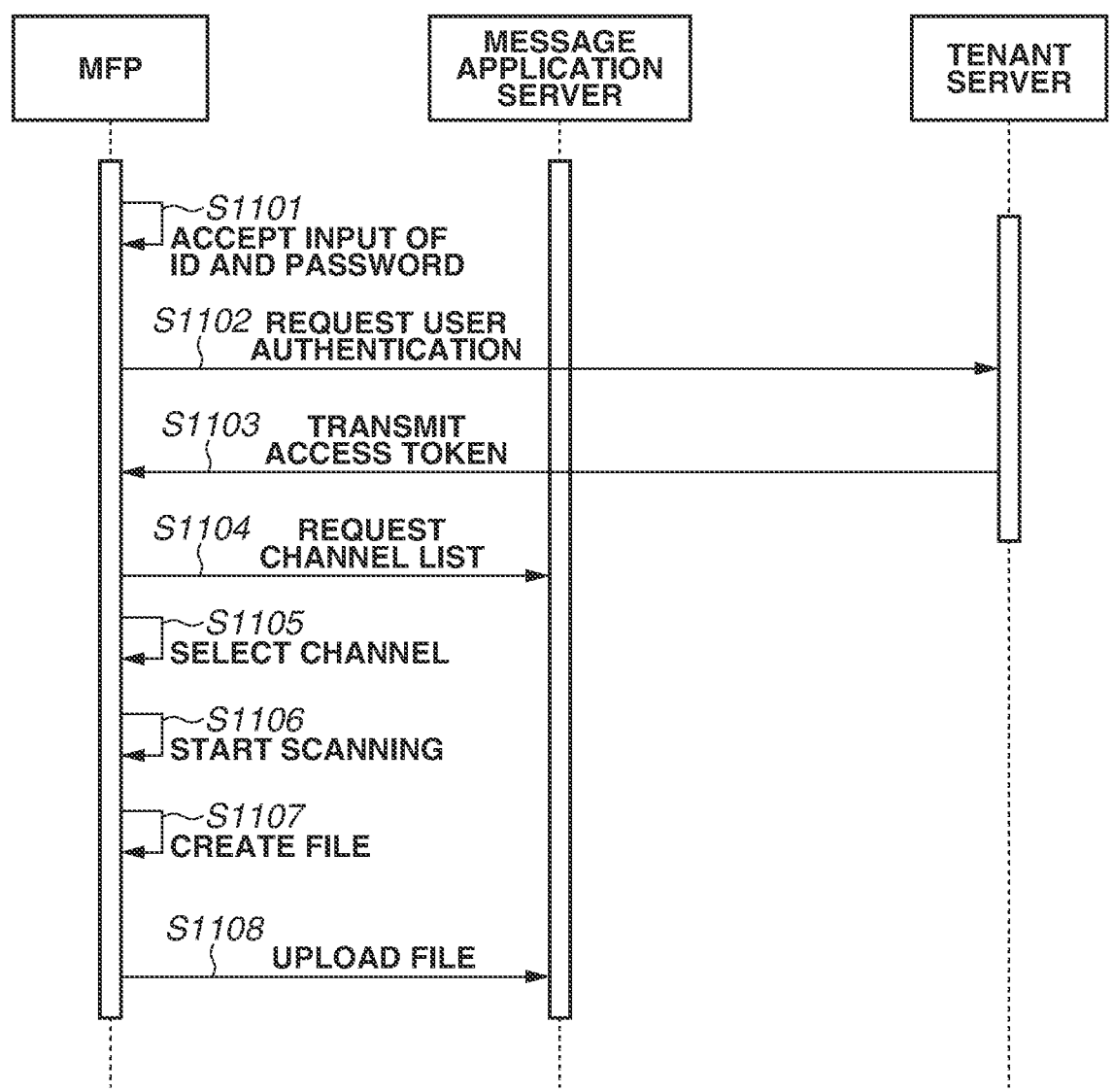
FIG. 12 is a diagram illustrating an example of transmission of a file, which is generated by scanning, from the MFP to the message application server.

FIG. 12 is a sequence to be performed when a file, which is generated by scanning a document, is uploaded from the MFP 10 to the message application server 30. The sequence is processing for uploading a file generated by scanning a document by the MFP 10, as in the message 707 in FIG. 8.

In step S1101, the CPU 111 of the MFP 10 accepts input of an ID and a password, which are information for a login from the user 1 to the message application server 30, via the operation unit 116.

In step S1102, the CPU 111 of the MFP 10 transmits the input ID and password to the tenant server 40 via the communication unit 124, thereby requesting authentication.

In step S1103, the CPU 401 of the tenant server 40 performs authentication using the received ID and password, and transmits a generated access token to the MFP 10 via the communication unit 404 if the authentication has succeeded (the received ID and password match a combination of an ID and a password stored in the HDD 405 of the tenant server 40).

In step S1104, the CPU 111 of the MFP 10 transmits a channel list acquisition request to the message application server 30 using the received access token, and acquires a channel list from the message application server 30.

In step S1105, the CPU 111 of the MFP 10 receives the user's selection of a channel from the acquired channel list via the operation unit 116.

In step S1106, the CPU 111 of the MFP 10 receives a scan instruction from the user 1 and scans a document using the reading unit 118.

In step S1107, the CPU 111 of the MFP 10 generates image data (a file such as a PDF file or a JPEG file) based on the image of the document scanned using the reading unit 118, and stores the image data in the storage 114 or the RAM 113.

In step S1108, the CPU 111 of the MFP 10 transmits a request for uploading the generated image data (file) to the selected channel, to the message application server 30. At this time, the generated file and the channel information indicating the channel to which the generated file is to be uploaded are transmitted, and the message application server 30 posts the received file based on the received channel information. At this time, information about the MFP 10 is set in the Created by field 904 for the uploaded file.

Figure 13:
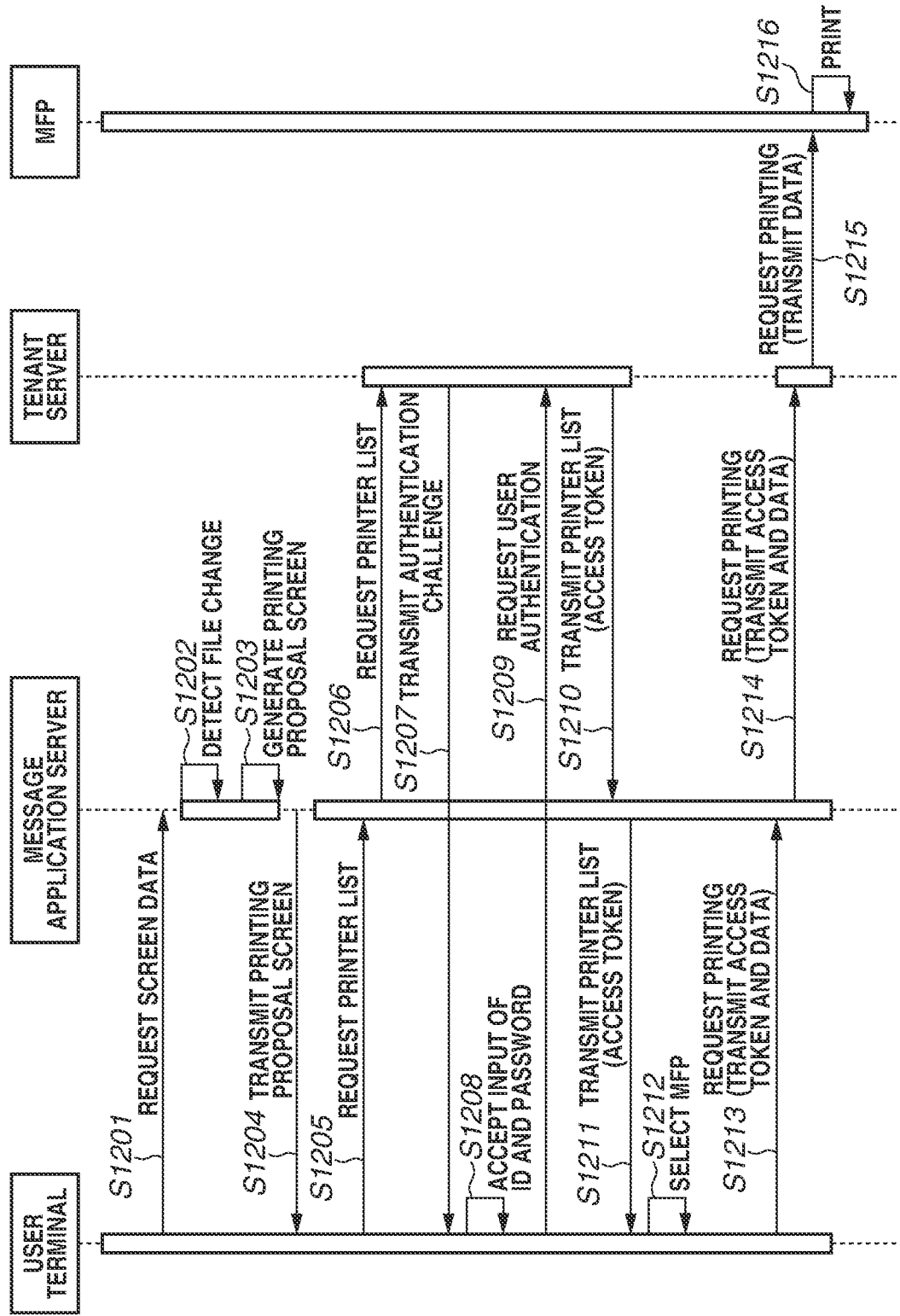
FIG. 13 is a diagram illustrating an example of transmission of a print execution request from the message application server to the MFP.

FIG. 13 is a sequence diagram illustrating an example of processing for posting the message 803 for proposing printing. The cooperative application 506 (the cooperative application A) has a function of transmitting the file uploaded from the user terminal 20 to the MFP 10 and causing the MFP 10 to print the file.

The sequence of the message application server 30 in FIG. 13 is implemented by the message application server 30 performing the operation of the cooperative application 506 (the cooperative application A).

In step S1201, the CPU 207 of the user terminal 20 transmits a request for displaying a message screen, to the message application server 30 via the wireless LAN communication unit 211. More specifically, the CPU 207 of the user terminal 20 transmits a request for screen data to be used by the user terminal 20 to display the message screen.

In step S1202, the cooperative application 506 (the cooperative application A) of the message application server 30 determines whether a file is uploaded.

In step S1203, when a file is uploaded, the cooperative application 506 (the cooperative application A) of the message application server 30 generates screen data for displaying the message 803 for proposing printing. If the message 803 for proposing printing is determined to be not posted in step S1003 or step S1011 in FIG. 11 (If the processing proceeds to YES in step S1003 or NO in step S1011), screen data not causing the display of the message 803 for proposing printing is to be generated.

In step S1204, the message application server 30 transmits the screen data generated in step S1203 to the user terminal 20. The user terminal 20 updates the display on the operation panel 201 based on the received screen data.

In step S1205, the CPU 207 of the user terminal 20 requests the message application server 30 to transmit a list of the printer information 606 associated with the user logged in the message application server 30.

In step S1206, the message application server 30 requests the tenant server 40 to transmit the list of the printer information 606 associated with the user. The processing in steps S1205 and S1206 has been described above using an example where the MFP 10 is associated with the user, but group information or channel information may be associated with the user. In this case, a list of the MFPs 10 corresponding to the group information or the channel information is requested.

In step S1207, the CPU 401 of the tenant server 40 transmits a request for acquiring user authentication information to the user terminal 20.

In step S1208, the user inputs the authentication information corresponding to the user's tenant data via the operation panel 201 of the user terminal 20. In this processing, the authentication information (the ID and the password) input when the user has logged into the message application server 30 may be used. In this case, the processing proceeds to step S1209 without the user inputting the authentication information in step S1208.

In step S1209, the CPU 207 of the user terminal 20 transmits the authentication information input in step S1208 to the tenant server 40 via the wireless LAN communication unit 211.

In step S1210, the CPU 401 of the tenant server 40 performs user authentication using the received authentication information. If the authentication has succeeded (If the received authentication information matches an ID and a password registered and stored in the HDD 405 in advance), the CPU 401 of the tenant server 40 searches a preregistered printer list to find the MFP 10 usable by the authenticated user, and transmits a control access token corresponding to the usable MFP 10 to the message application server 30. In a case where the user is associated with a group or a channel instead of the MFP 10, the CPU 401 of the tenant server 40 transmits a control access token corresponding to the MFP 10 corresponding to the group or the channel.

In step S1211, the cooperative application 506 (the cooperative application A) of the message application server 30 transmits the control access token corresponding to the MFP 10, which has been acquired in step S1210, to the user terminal 20.

In step S1212, the CPU 207 of the user terminal 20 uses the operation panel 201 to display information about the usable MFP 10 thereon. The user selects the desired MFP 10 and the desired file to be printed. In a case where a single file is uploaded, the user selects the MFP 10 without selecting the file.

In step S1213, the CPU 207 of the user terminal 20 transmits the control access token corresponding to the MFP 10 selected in step S1212 and the file selected in step S1212, to the message application server 30 via the wireless LAN communication unit 211.

In step S1214, the cooperative application 506 (the cooperative application A) of the message application server 30 transmits the control access token and the file, which are received in step S1213, to the tenant server 40.

In step S1215, the CPU 401 of the tenant server 40 transmits the file (the image data) and the print instruction to the MFP 10 corresponding to the control access token received in step S1214, via the communication unit 404.

In step S1216, the CPU 111 of the MFP 10 uses the printing unit 120 to perform processing for printing the file (the image data) received in step S1215, according to the print instruction received in step S1215.

The above-described configuration can prevent an unnecessary message from being displayed when whether to cause the printer (the MFP) to print data is determined in response to the upload of the data to the chat room.

The case where the message 803 for proposing printing is posted in the form of a chat has been described above as an example, but the configuration is not limited thereto. For example, a configuration in which a pop-up screen is displayed on the message screen in response to the upload of a file and print settings and a print instruction are received on the pop-up screen may be used. In this case, the cooperative application 506 (the cooperative application A) causes the message application server 30 to generate the pop-up screen.

The configurations illustrated in the present exemplary embodiment are an example, and the present disclosure is not limited to the illustrated configurations. For example, performing the authentication operation every time can be eliminated by storing, in the message application server 30 or the user terminal 20, information about the control access token acquired in the control access token acquisition processing in steps S1205 to S1212.

The exemplary embodiment of the present disclosure can also be implemented by supplying a program for implementing one or more functions according to the above-described exemplary embodiment to a system or an apparatus via a network or a storage medium, and then causing one or more processors in a computer of the system or the apparatus to read and execute the program. Alternatively, the exemplary embodiment of the present disclosure can also be implemented by a circuit (e.g., an ASIC) for implementing one or more functions according to the exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-096224, filed Jun. 8, 2021, which is hereby incorporated by reference herein in its entirety.

What is claimed is:

1. An information processing method comprising:
executing, based on posting of a file to a chat room of a chat service, a first posting process for posting a post including a displayed object to the chat room, the displayed object being an object for inputting a print instruction for executing first print processing based on the posted file;
transmitting the file posted to the chat room of the chat service to an image forming apparatus and causing the image forming apparatus to execute the first print processing based on the posted file, based on the print instruction input via the displayed object;
executing, based on update of the posted file, a second posting process for posting a second post including a second displayed object to the chat room, the second displayed object being an object for inputting a second print instruction for executing second print processing based on the updated file; and
transmitting the updated file to the image forming apparatus and causing the image forming apparatus to execute the second print processing based on the updated file, based on the second print instruction input via the second displayed object,
wherein, in a case that a source file that is a source of the updated file has been printed in the first print processing, the second post including the second displayed object is posted by executing the second posting process, and
wherein, in a case that the source file that is the source of the updated file has not been printed in the first print processing, the second posting process is not executed.

2. The information processing method according to claim 1, wherein a file format of the posted file is a file format printable by the image forming apparatus to which the posted file is to be transmitted, and
wherein a file format of the updated file is not the file format printable by the image forming apparatus to which the updated file is to be transmitted.

3. The information processing method according to claim 1, wherein a file format of the posted file is a file format printable by the image forming apparatus registered in association with a user logged in to the chat service, and
wherein a second file format of the updated file is the file format printable by the image forming apparatus registered in association with the user logged in to the chat service.

4. The information processing method according to claim 1, wherein the information processing method is executed by a print bot program, and
wherein, in a case that the posted file is of a file format not printable by the image forming apparatus, the print bot program does not execute the first posting process.

5. The information processing method according to claim 1, wherein the chat room is a chat room in which a plurality of users post messages.

6. The information processing method according to claim 1, wherein the object is displayed as a message posted to the chat room.

7. A non-transitory computer-readable storage medium storing a program that, when executed by a chat server, causes the chat server to perform an information processing method, the information processing method comprising:
executing, based on posting of a file to a chat room of a chat service, a first posting process for posting a post including a displayed object to the chat room, the displayed object being an object for inputting a print instruction for executing first print processing based on the posted file;
transmitting the file posted to the chat room of the chat service to an image forming apparatus and causing the image forming apparatus to execute the first print processing based on the posted file, based on the print instruction input via the displayed object; and
executing, based on update of the posted file, a second posting process for posting a second post including a second displayed object to the chat room, the second displayed object being an object for inputting a second print instruction for executing second print processing based on the updated file; and
transmitting the updated file to the image forming apparatus and causing the image forming apparatus to execute the second print processing based on the updated file, based on the second print instruction input via the second displayed object,
wherein, in a case that a source file that is a source of the updated file has been printed in the first print processing, the second post including the second displayed object is posted by executing the second posting process, and
wherein, in a case that the source file that is the source of the updated file has not been printed in the first print processing, the second posting process is not executed.

8. The storage medium according to claim 7, wherein a file format of the posted file is a file format printable by the image forming apparatus to which the posted file is to be transmitted, and
wherein a file format of the updated file is not the file format printable by the image forming apparatus to which the updated file is to be transmitted.

9. The storage medium according to claim 7,
wherein a file format of the posted file is a file format printable by the image forming apparatus registered in association with a user logged in to the chat service, and wherein a second file format of the updated file is the file format printable by the image forming apparatus registered in association with the user logged in to the chat service.

10. The storage medium according to claim 7, wherein the program is a print bot program, and
wherein, in a case that the posted file is of a file format not printable by the image forming apparatus, the print bot program does not execute the first posting process is not executed.

11. The storage medium according to claim 7, wherein the chat room is a chat room in which a plurality of users post messages.

12. The storage medium according to claim 7, wherein the object is displayed as a message posted to the chat room.

13. A chat server comprising:
a controller,
wherein the controller executes, based on posting of a file to a chat room of a chat service, a first posting process for posting a post including a displayed object to the chat room, the displayed object being an object for inputting a print instruction for executing first print processing based on the posted file, and
wherein the controller executes, based on update of the posted file, a second posting process for posting a second post including a second displayed object to the chat room, the second displayed object being an object for inputting a second print instruction for executing second print processing based on the updated file; and
a network interface,
wherein the network interface transmits the file posted to the chat room of the chat service to an image forming apparatus and causes the image forming apparatus to execute the first print processing based on the posted file, based on the print instruction input via the displayed object,
wherein the network interface transmits the updated file to the image forming apparatus and causes the image forming apparatus to execute the second print processing based on the updated file, based on the second print instruction input via the second displayed object,
wherein, in a case that a source file that is a source of the updated file has been printed in the first print processing, the second post including the second displayed object is posted by executing the second posting process, and
wherein, in a case that the source file that is the source of the updated file has not been printed in the first print processing, the second posting process is not executed.

* * * * *